United States Patent
Spencer et al.

(10) Patent No.: US 6,296,186 B1
(45) Date of Patent: Oct. 2, 2001

(54) PRODUCE RECOGNITION SYSTEM INCLUDING A PRODUCE SHAPE COLLECTOR

(75) Inventors: Michael A. Spencer, Suwanee; Donald A. Collins, Jr., Lawrenceville, both of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/197,337

(22) Filed: Nov. 19, 1998

(51) Int. Cl.$^7$ .................................................. G06K 7/10
(52) U.S. Cl. ........................... 235/462.01; 235/462.25
(58) Field of Search ...................... 235/462.01–462.46, 235/472.01, 494, 375, 454, 455

(56) References Cited

U.S. PATENT DOCUMENTS

| | | | |
|---|---|---|---|
| 3,623,814 | 11/1971 | Buhrer | 356/114 |
| 3,748,048 | 7/1973 | Upatnieks et al. | 356/212 |
| 3,814,521 | * 6/1974 | Free | 356/71 |
| 4,395,124 | 7/1983 | Remijan | 356/373 |
| 5,016,951 | 5/1991 | Deason et al. | 350/3.67 |
| 5,071,208 | 12/1991 | Chang | 359/10 |
| 5,124,815 | 6/1992 | Chang | 359/10 |
| 5,166,755 | 11/1992 | Gat | 356/419 |
| 5,546,475 | * 8/1996 | Bolle et al. | 382/190 |
| 5,642,209 | 6/1997 | Baker | 359/10 |
| 5,684,611 | 11/1997 | Rakuljic et al. | 359/7 |

* cited by examiner

Primary Examiner—Thien M. Le
(74) Attorney, Agent, or Firm—Paul W. Martin

(57) ABSTRACT

A produce recognition system which identifies a produce item by comparing its shape with reference shape information. The system includes a produce shape data collector which includes a light projector which generates a plurality of lines of light for illuminating a produce item with the plurality of lines of light. The lines of light bend across the outer surface of the produce item thereby assuming the shape of the produce item. The produce data collector further includes an image capture device which captures an image of the lines of light during illumination of the produce item, and control circuitry for controlling operation of the light projector and the image capture device. The system further includes a computer which compares shape data in the image with reference shape data to identify the produce item.

32 Claims, 3 Drawing Sheets

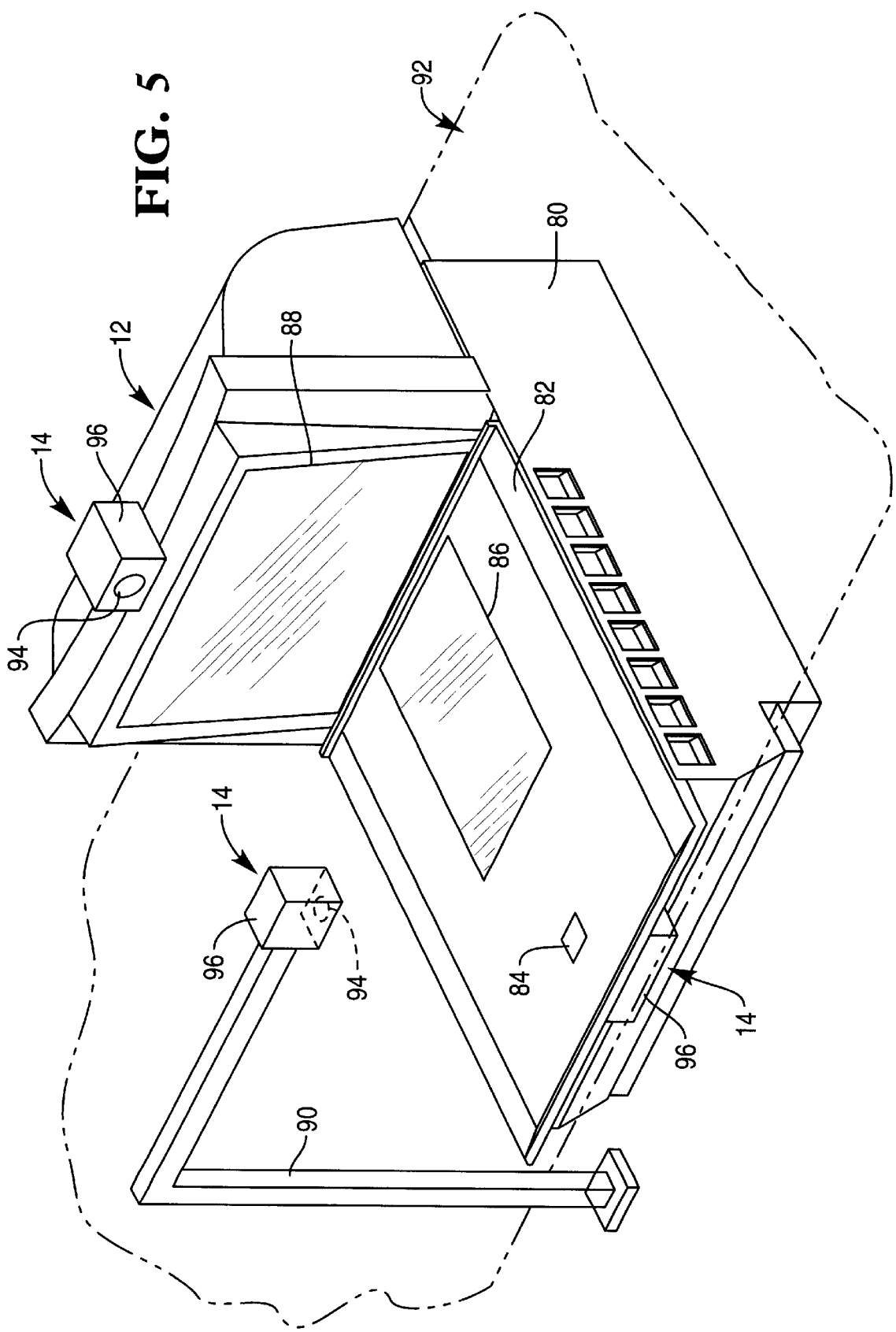

PRODUCE RECOGNITION SYSTEM INCLUDING A PRODUCE SHAPE COLLECTOR

BACKGROUND OF THE INVENTION

The present invention relates to produce recognition system and more specifically to a produce recognition system including a produce shape data collector.

Bar code readers are well known for their usefulness in retail checkout and inventory control. Bar code readers are capable of identifying and recording most items during a typical transaction since most items are labeled with bar codes.

Items which are typically not identified and recorded by a bar code reader are produce items, since produce items are typically not labeled with bar codes. Bar code readers may include a scale for weighing produce items to assist in determining the price of such items. But identification of produce items is still a task for the checkout operator, who must identify a produce item and then manually enter an item identification code. Operators must visually examine produce for a variety of indicators, such as shape, color, and texture, and compare these indicators to pictures of produce items. But operator identification methods are slow, inefficient, and prone to error on the order of fifteen percent.

Therefore, it would be desirable to provide a produce recognition system which can minimize operator involvement in produce identification and entry into a transaction. It would be desirable to provide as part of that produce recognition system a produce shape data collector which collects shape information for use in identifying the produce item.

SUMMARY OF THE INVENTION

In accordance with the teachings of the present invention, a produce recognition system including a produce shape data collector is provided.

The system includes a produce shape data collector which includes a light projector which generates a plurality of lines of light for illuminating a produce item with the plurality of lines of light. The lines of light bend across the outer surface of the produce item thereby assuming the shape of the produce item. The produce data collector further includes an image capture device which captures an image of the lines of light during illumination of the produce item, and control circuitry for controlling operation of the light projector and the image capture device. The system further includes a computer which compares shape data in the image with reference shape data to identify the produce item.

It is a feature of one embodiment of the present invention that the produce data collector only includes stationary, non-moving parts.

It is accordingly an object of the present invention to provide a produce recognition system including a produce shape data collector.

It is another object of the present invention to provide a produce recognition system including a produce shape data collector which projects a plurality of lines of light on a produce item.

It is another object of the present invention to provide a produce recognition system including a produce shape data collector which projects a light grid pattern on a produce item.

It is another object of the present invention to provide a produce recognition system including a produce shape data collector which uses minimal cost elements.

It is another object of the present invention to provide a produce recognition system including a produce shape data collector which uses only non-moving elements.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 5 is a representation of example mounting arrangements for the produce shape data collector.

DETAILED DESCRIPTION OF THE PREFERRED EMBODIMENT

Figure 1:
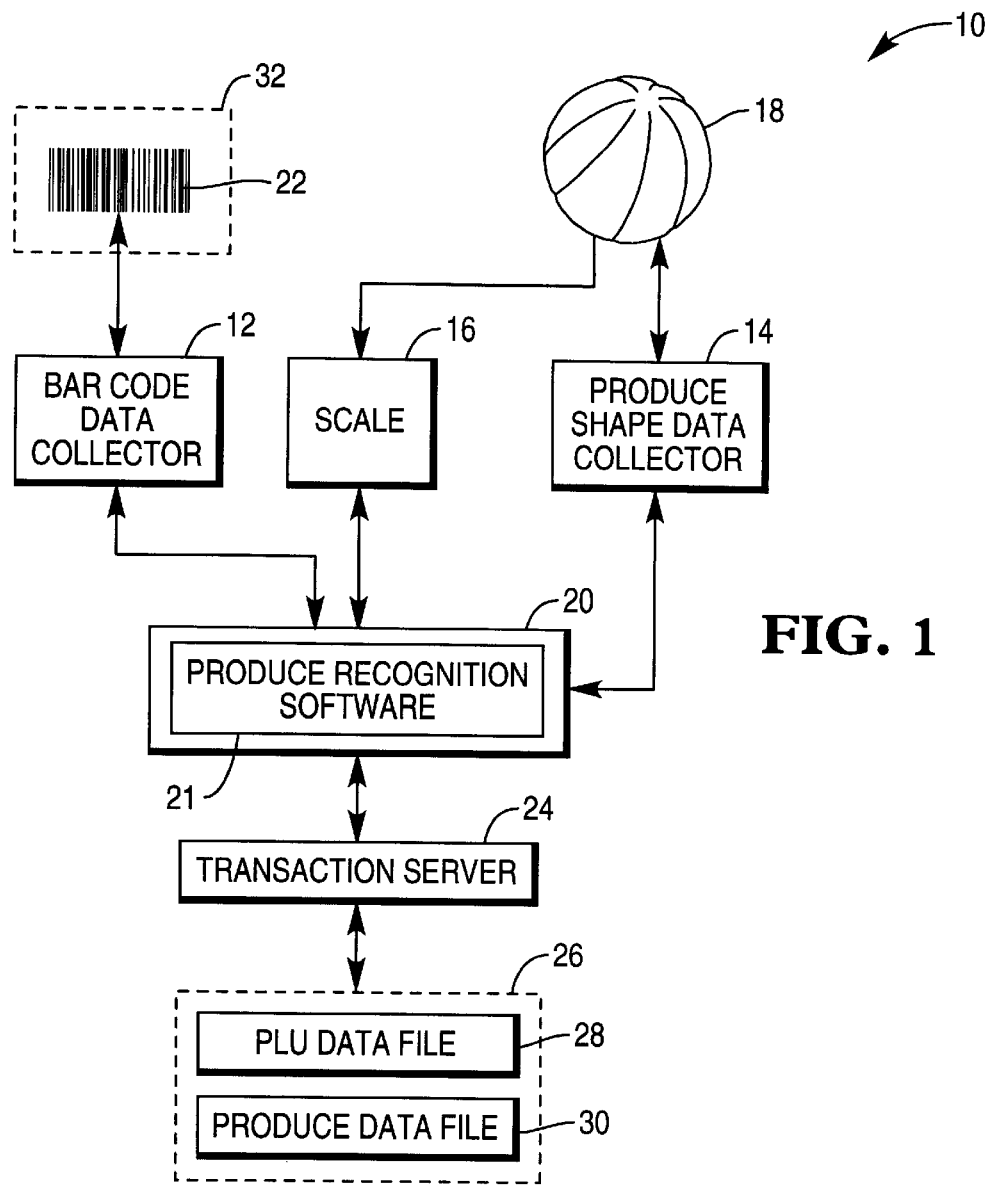
FIG. 1 is a block diagram of a transaction processing system including a produce recognition system and the produce shape data collector of the present invention.

Referring now to FIG. 1, transaction processing system 10 primarily includes bar code data collector 12, scale 16, and produce shape data collector 14.

Produce shape data collector 14 collects shape data associated with produce item 18 for the purpose of identifying produce item 18. Reference produce shape data is collected and stored within produce data file 30. During a transaction, produce shape data is collected and compared to produce shape data within produce data file 30. Produce shape data collector 14 may act as either a primary or secondary means of identifying produce item 18. Produce shape data collector 14 may also be combined with bar code data collector 12 into an integrated unit.

System 10 may optionally include supplemental produce data collectors, which provides additional data to assist in identifying produce item 18. Supplemental produce data collectors may provide data such as color data, color distribution data, and/or aromatic data, either as a primary or secondary means of identifying produce item 18. Reference produce data is collected and stored within produce data file 30.

Bar code data collector 12 reads bar code 22 on merchandise item 32 to obtain an item identification number, also known as a price look-up (PLU) number, associated with item 32. Bar code data collector 12 may be any bar code data collector, including an optical bar code scanner which uses laser beams to read bar codes. Bar code data collector 12 may be located within a checkout counter or mounted on top of a checkout counter.

Scale 16 determines a weight for produce item 18. Scale 16 works in connection with bar code data collector 12, but may be designed to operate and be mounted separately. Scale 16 sends weight information for produce item 18 to transaction terminal 20 so that transaction terminal 20 can determine a price for produce item 18 based upon the weight information. Weight information from scale 16 may also be used to identify produce item 18.

Transaction terminal 20 controls operation of bar code data collector 12, produce shape data collector 14, and scale 16 and preferably includes additional peripherals as necessary to allow an operator to complete a transaction with a customer. Transaction terminal 20 executes produce recognition software 21 which obtains image data containing shape information from produce shape data collector 14 and compares the image data with reference image data in produce data file 30 to identify produce item 18.

Alternatively, transaction server 24 may identify produce item 18 in the preceding manner in a network of transaction terminals 20.

In either case, transaction server 24 obtains item identification information from produce data file 30 and sends a corresponding unit price from PLU data file 28 to transaction terminal 20. Transaction terminal 20 calculates a price for produce item 18 by multiplying the unit price by the weight of produce item 18 obtained from scale 16. Transaction terminal 20 incorporates produce item 18 and its calculate price into the transaction record.

PLU data file 28 and produce data file 30 are stored within storage medium 26, but either may also be located instead at transaction terminal 20.

Figure 2:
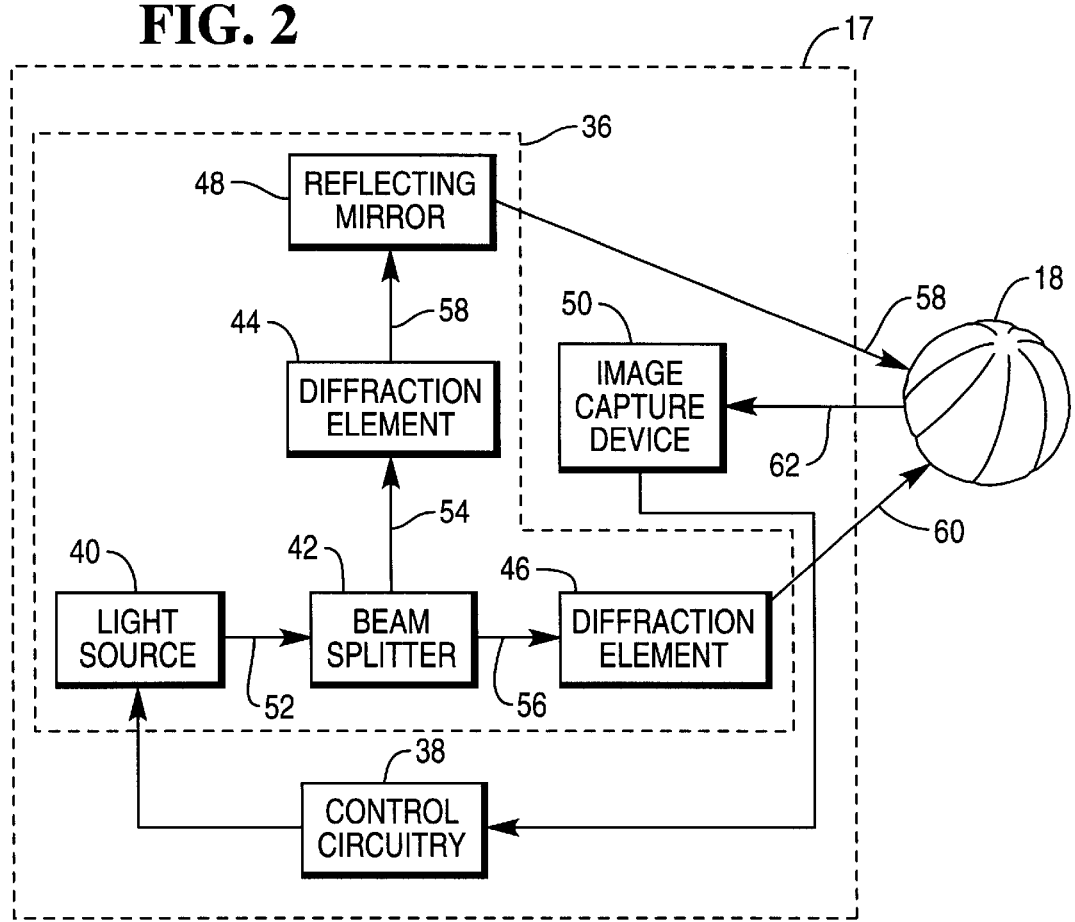
FIG. 2 is a block diagram of the produce shape data collector.

Turning now to FIG. 2, produce shape data includes light projector 36, control circuitry 38, and image capture device 50. Light projector 36 includes light source 40, beam splitter 42, diffraction element 44, diffraction element 46, and reflecting mirror 48.

Light source 40 is preferably an infrared laser.

Beam splitter 42 splits diverging laser beam 52 from laser 40 into two diverging beams 54 and 56. Beam splitter 42 preferably divides beam 52 in half so that beams 54 and 56 have substantially equal intensity levels. Alternatively, two laser sources 40 may be employed to produce separate beams 54 and 56.

Diffraction elements 44 and 46 diffract diverging beams 54 and 56 to produce diffraction patterns 58 and 60. Diffraction elements 44 and 46 are preferably Ronchi elements which contain about fifty Ronchi rulings per inch. Diffraction elements 44 and 46 are optimally oriented for shape recognition purposes so that diffraction pattern 58 is substantially perpendicular to diffraction pattern 60.

Figure 3:
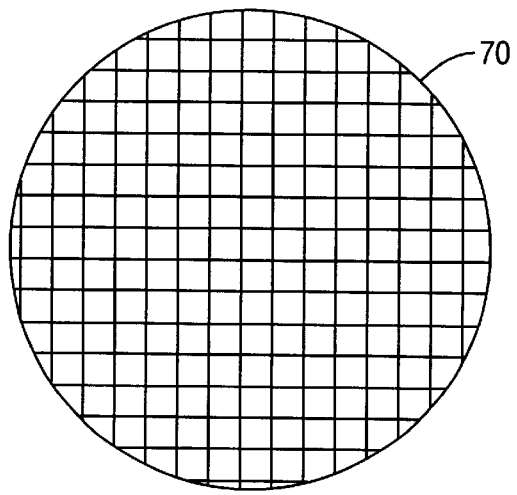
FIG. 3 is a representation of a light grid pattern on a plane parallel to the output window, created by the produce shape data collector.
Figure 4:
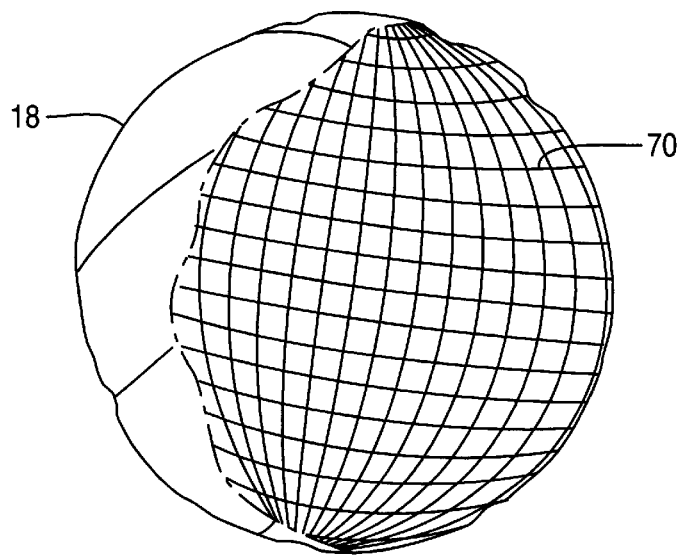
FIG. 4 is a representation of the light grid pattern in the presence of a produce item.

Reflecting mirror 48 directs diffraction pattern 58 into an overlapping relationship with diffraction pattern 60 to form light grid pattern 70 (FIGS. 3 and 4).

Control circuitry 38 controls operation of light source 40. Control circuitry 38 activates light source 40, either automatically when produce item 18 is placed upon scale 16, or in response to operator-initiated commands from transaction terminal 20. Control circuitry 38 additionally controls image capture device 50 and sends image data from image capture device 50 to transaction terminal 20.

Image capture device 50 captures image 62 of light grid pattern 70 while it is wrapped around produce item 18. Image capture device 50 is preferably a charge coupled device (CCD) or complimentary metal oxide semiconductor (CMOS) camera.

Advantageously, produce shape data collector 14 does not include expensive machined diffractive optics or failure-prone moving parts.

Turning now to FIGS. 3 and 4, light grid pattern 70 is shown. FIG. 3 illustrates that light grid pattern 70 includes substantially straight lines when produce item is absent. FIG. 4 illustrates that light grid pattern 70 includes curved lines which follow and conform to outer surface 72 of produce item 70 when produce item 18 is illuminated by light grid pattern 70. The spacing of the lines is dependent upon the object distance from the device. The curvature of the lines is dependent upon the curvature of the object, and it's surface irregularities.

Produce recognition software 21 compares collected image data with reference image data. In particular, produce recognition software 21 compares light grid pattern 70 and its characteristics and features with reference light grid patterns, characteristics, and features stored within produce data file 30. Produce recognition software 21 determines a likely candidate or list of ranked candidates and preferably displays the list and/or stored images of produce items on the list for verification by an operator.

Referring to FIG. 5, three example mounting arrangements are shown for produce shape data collector. A first mounting arrangement for produce shape data collector 14 is to mount its housing 96 within housing 80 of one type of bar code data collector 12, an optical bar code reader, model 7875, manufactured by the assignee of the present invention. Preferably, produce shape data collector 14 is mounted outside the paths of light within the optical bar code reader to avoid interference with the operation of the optical bar code reader. Thus, produce shape data collector 14 may be mounted above aperture 88 so that aperture 94 faces an operator or in front of aperture 86 so that aperture 94 faces upward. The latter mounting method requires an aperture 84 within scale weight plate 82.

Another mounting arrangement for produce shape data collector 14 is to attach housing 96 to a pole 90 mounted to checkout counter 92 so that aperture 94 faces downward.

In each case, an operator initiates operation of produce shape data collector 14 at transaction terminal 20 and momentarily places produce item 18 over aperture 94. Produce shape data collector 14 captures image data in less than a second, well within normal produce handling time.

Although the invention has been described with particular reference to certain preferred embodiments thereof, variations and modifications of the present invention can be effected within the spirit and scope of the following claims.

We claim:

1. A produce shape data collector comprising:
    a light projector which generates a plurality of lines of light for illuminating a produce item with the plurality of lines of light;
    wherein the light projector includes a light source for producing a beam of light, and a diffraction element which diffracts the beam to produce the plurality of lines of light; and
    an image capture device which captures an image of the lines of light during illumination of the produce item.

2. The produce shape data collector as recited in claim 1, wherein the light projector generates a plurality of intersecting lines of light.

3. The produce shape data collector as recited in claim 1, wherein the light projector generates a plurality of lines of light which intersect at about a ninety-degree angle.

4. The produce shape data collector as recited in claim 1, wherein the light source comprises:
    a laser.

5. The produce shape data collector as recited in claim 4, wherein the laser comprises:
    an infrared laser.

6. The produce shape data collector as recited in claim 1, wherein the diffraction element comprises:
    a Ronchi element.

7. The produce shape data collector as recited in claim 6, wherein the Ronchi element has about fifty Ronchi rulings per inch.

8. The produce shape data collector as recited in claim 1, wherein the light projector further comprises:
   another light source for producing another beam of light; and
   another diffraction element which diffracts the other beam to produce another plurality of lines of light.

9. The produce shape data collector as recited in claim 8, wherein the other light source comprises:
   a laser.

10. The produce shape data collector as recited in claim 8, wherein the other light source comprises:
    a beam splitter which splits the one beam of light to produce the other beam of light.

11. The produce shape data collector as recited in claim 10, wherein the light projector further comprises:
    a reflecting mirror which directs the other plurality of lines of light towards the produce item.

12. The produce shape data collector as recited in claim 8, wherein the other diffraction element comprises:
    a Ronchi element.

13. The produce shape data collector as recited in claim 8, wherein the one and the other diffraction elements are oriented so that the one plurality of lines of light and the other plurality of lines of light intersect.

14. The produce shape data collector as recited in claim 1, further comprising:
    control circuitry for controlling operation of the light source and the image capture device.

15. The produce shape data collector as recited in claim 14, wherein the control circuitry turns on the light source in response to a signal produced when the produce item is placed on a scale.

16. The produce shape data collector as recited in claim 14, wherein the control circuitry turns on the light source in response to a signal produced by a transaction terminal upon operator input.

17. The produce shape data collector as recited in claim 1, wherein the image capture device comprises:
    a charge coupled device (CCD) camera.

18. The produce shape data collector as recited in claim 1, wherein the image capture device comprises:
    a complimentary metal oxide semiconductor (CMOS) camera.

19. A produce shape data collector comprising:
    a light projector which generates a plurality of intersecting lines of light for illuminating a produce item with the plurality of intersecting lines of light, including
      a number of light sources for producing at least first and second beams of light;
      a first diffraction element which diffracts the first beam to produce a first plurality of lines of light;
      a second diffraction element which diffracts the second beam to produce a second plurality of lines of light, wherein the second diffraction element is oriented with respect to the first diffraction element so as to cause the second plurality of lines of light to intersect the first plurality of lines of light;
    an image capture device which captures an image of the intersecting lines of light during illumination of the produce item; and
    control circuitry for controlling operation of the number of light sources and the image capture device.

20. A produce recognition system comprising:
    a produce shape data collector including
      a light projector which generates a plurality of lines of light for illuminating a produce item with the plurality of lines of light;
      wherein the light projector includes a light source for producing a beam of light, and a diffraction element which diffracts the beam to produce the plurality of lines of light;
      an image capture device which captures an image of the lines of light during illumination of the produce item; and
      control circuitry for controlling operation of the light projector and the image capture device; and
    a computer which compares shape data in the image with reference shape data for a plurality of different types of produce items to identify the produce item.

21. The system as recited in claim 20, wherein the computer comprises:
    a transaction terminal for completing a sale of the produce item.

22. The system as recited in claim 20, wherein the computer comprises:
    a server in a store in which the produce item is sold.

23. The system as recited in claim 20, wherein the computer generates a list of likely candidates for the produce item and displays the likely candidates for verification of identity by an operator.

24. The system as recited in claim 20, wherein the produce shape data collector is mounted to a bar code reader.

25. The system as recited in claim 20, wherein the produce shape data collector is mounted to a checkout counter.

26. A produce recognition system comprising:
    a produce shape data collector including
      a light projector which generates a plurality of intersecting lines of light for illuminating a produce item with the plurality of intersecting lines of light, including
        a number of light sources for producing at least first and second beams of light;
        a first diffraction element which diffracts the first beam to produce a first plurality of lines of light;
        a second diffraction element which diffracts the second beam to produce a second plurality of lines of light, wherein the second diffraction element is oriented with respect to the first diffraction element so as to cause the second plurality of lines of light to intersect the first plurality of lines of light;
      an image capture device which captures an image of the intersecting lines of light during illumination of the produce item; and
      control circuitry for controlling operation of the number of light sources and the image capture device; and
    a computer which compares shape data in the image with reference shape data to identify the produce item.

27. A method of collecting shape data associated with a produce item comprising the steps of:
    (a) projecting a plurality of intersecting lines of light onto the produce item; and
    (b) capturing an image of the intersecting lines of light.

28. A method of recognizing a produce item comprising the steps of:
    (a) projecting a plurality of intersecting lines of light onto the produce item;
    (b) capturing an image of the intersecting lines of light; and
    (c) comparing shape information in the image with reference shape information for a plurality of different types of produce items to identify the produce item.

29. A method of recording a purchase of a produce item comprising the steps of:
(a) projecting a plurality of lines of light onto the produce item;
(b) capturing an image of the lines of light;
(c) comparing shape information in the image with reference shape information for a plurality of different types of produce items to identify the produce item;
(d) recording a weight of the produce item as it rests upon a scale; and
(e) determining price information for the produce item from weight information and identification information.

30. A produce shape data collector comprising:
a light projector which generates a plurality of intersecting lines of light for illuminating a produce item with the plurality of intersecting lines of light, including
a number of lasers for producing at least first and second beams of light;
a first diffraction element which diffracts the first beam to produce a first plurality of lines of light;
a second diffraction element which diffracts the second beam to produce a second plurality of lines of light, wherein the second diffraction element is oriented with respect to the first diffraction element so as to cause the second plurality of lines of light to intersect the first plurality of lines of light;
an image capture device which captures an image of the intersecting lines of light during illumination of the produce item; and
control circuitry for controlling operation of the number of lasers and the image capture device.

31. A method of collecting shape data associated with a produce item comprising the steps of:
(a) activating a light source to produce a beam of light;
(b) diffracting the beam to produce a plurality of lines of light directed at the produce item; and
(c) capturing an image of the lines of light.

32. A method of collecting shape data associated with a produce item comprising the steps of:
(a) activating a number of lasers to produce first and second beams of light;
(b) diffracting the first and second beams to produce a plurality of intersecting lines of light directed at the produce item; and
(c) capturing an image of the intersecting lines of light.

* * * * *

UNITED STATES PATENT AND TRADEMARK OFFICE
CERTIFICATE OF CORRECTION

PATENT NO.    : 6,296,186 B1                                  Page 1 of 1
DATED         : October 2, 2001
INVENTOR(S)   : Michael A. Spencer et al.

It is certified that error appears in the above-identified patent and that said Letters Patent is hereby corrected as shown below:

<u>Title page,</u>
Item [54], after "SHAPE", insert -- DATA --.

Signed and Sealed this

Twenty-first Day of January, 2003

JAMES E. ROGAN
*Director of the United States Patent and Trademark Office*